March 12, 1957 C. S. WARREN 2,785,389

MAGNETIC SWITCHING SYSTEM

Filed April 29, 1955 3 Sheets-Sheet 1

INVENTOR.
Charles S. Warren
BY Morris A. Rabkin
ATTORNEY.

INVENTOR.
Charles S. Warren
BY Morris A. Rakin
ATTORNEY.

MAGNETIC SWITCHING SYSTEM

Filed April 29, 1955

3 Sheets-Sheet 3

INVENTOR.
*Charles S. Warren*
BY
*Morris A. Rabkin*
ATTORNEY.

United States Patent Office
2,785,389
Patented Mar. 12, 1957

2,785,389
MAGNETIC SWITCHING SYSTEM

Charles S. Warren, Collingswood, N. J., assignor to Radio Corporation of America, a corporation of Delaware Application April 29, 1955, Serial No. 504,800
8 Claims. (Cl. 340—174)

Figures 1, 3:
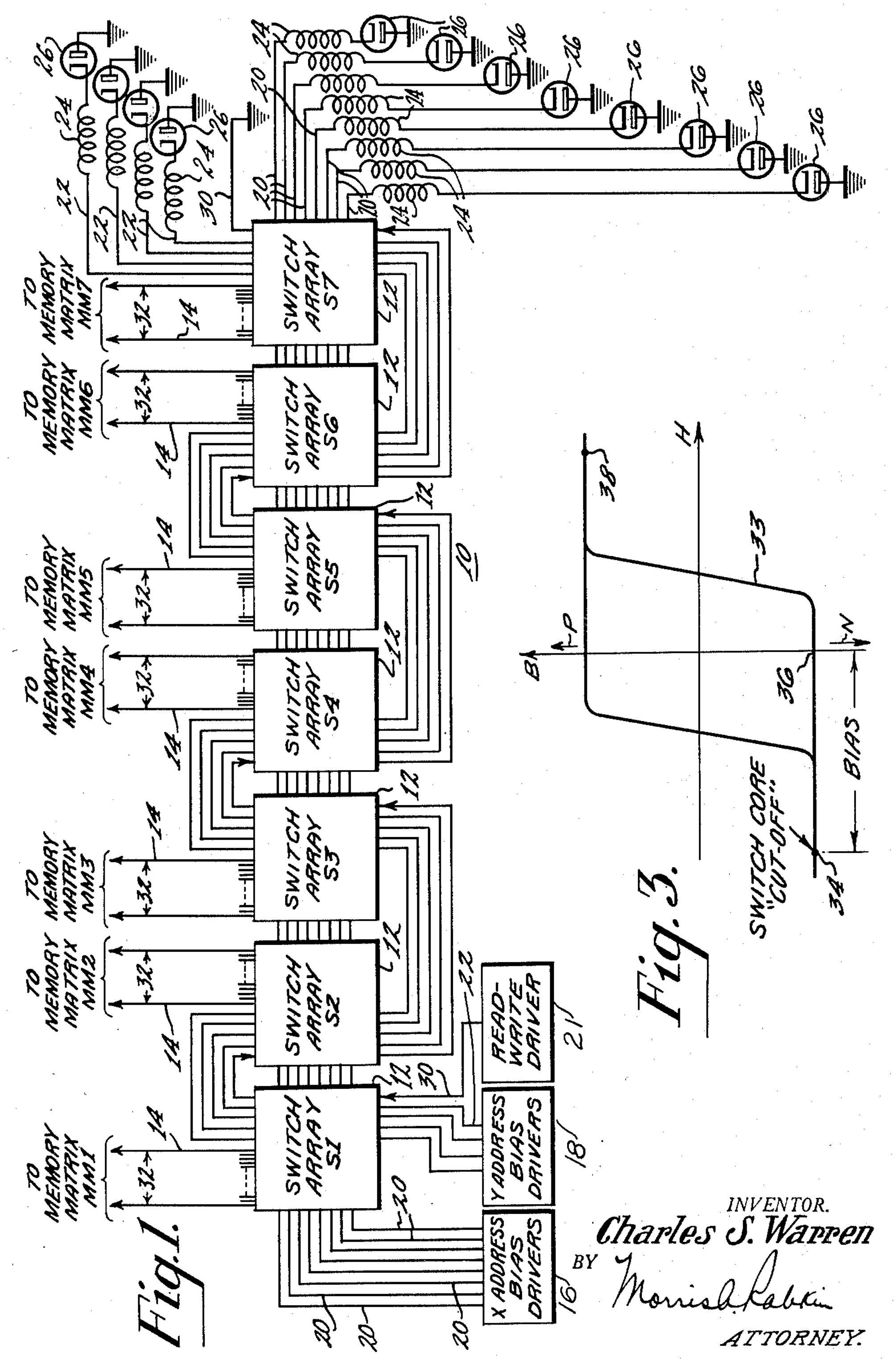

This invention relates to magnetic switches, and more particularly to an improved apparatus for selective magnetic switching.

Magnetic switch arrays employing a plurality of magnetic cores are used for selecting one out of many outputs in accordance with a coded input. For example, one or more magnetic switches may be provided for addressing a magnetic memory. Magnetic switch arrays may be employed in combinatorial switches and code converting devices.

The driving power for a magnetic switch is often supplied by electronic devices such as vacuum tubes; for example, one tube connected to each switch row coil and one connected to each switch column coil. Each row coil and each column coil, respectively, then link all the cores in a different row and all the cores in a different column. The row and column coils are usually connected to a common ground at adjacent extremities. A bias current may be applied to each row and column coil.

A switch core may be selected by removing the bias current from the one row coil and the one column coil linked to that core. The selected core may be driven to an opposite direction of magnetization from its previous direction by a drive current. When a selected switch core is driven from one of its two directions of saturation to the other, a voltage is induced in each winding linked thereto. The induced voltage generates a circulating current which flows in a closed path in the selected coil through the distributed capacity between the coil linkages and the common ground back to the selected coil.

This circulating current reaches an appreciable amount when a large number of selected switch cores are linked by the same coil. For example, a number of switch arrays may be connected in parallel in order to select a plurality of outputs at the same time. Such parallel arrangements are useful in magnetic memory systems when a plurality of binary digits are written into or read out of the memory in parallel. When a number of switch cores are selected at the same time, there is a circulating current generated by each of the driven cores. The sum total of the circulating currents acting on certain cores of the array, and particularly the end cores, may become sufficiently large to prevent these certain cores from being driven to the opposite direction of magnetization by the drive current.

It is an object of the present invention to provide improved apparatus for reducing undesired circulating currents in a magnetic switch array.

Another object of the present invention is to provide improved means for preventing undesired circulating currents from flowing in selected ones of the coils when selecting certain ones of the switch cores for producing an output signal.

A further object of the present invention is to provide an improved magnetic switch array that can be operated at relatively high speeds without producing appreciable circulating currents.

According to the invention, a switch array has a coil coupled to a plurality of switch cores. A bias current is normally applied to the coil for biasing each switch core linked thereby to saturation in one direction. An inductive element and a unilateral conducting device connect the coil to a common ground. When the bias current is removed from the coil, the inductive element provides a relatively high surge of back voltage sufficient to charge the distributed capacitances associated with the coil. The charged distributed capacitances bias the connected unilateral conducting device to cut-off. Drive currents are applied to drive windings linking selected ones of the switch cores for producing corresponding output signals. The cut-off diode tends to prevent circulating currents from flowing when these selected switch cores are driven between the two directions of saturation. Thus all the selected switch cores produce an output signal in response to the drive currents.

Figure 2:
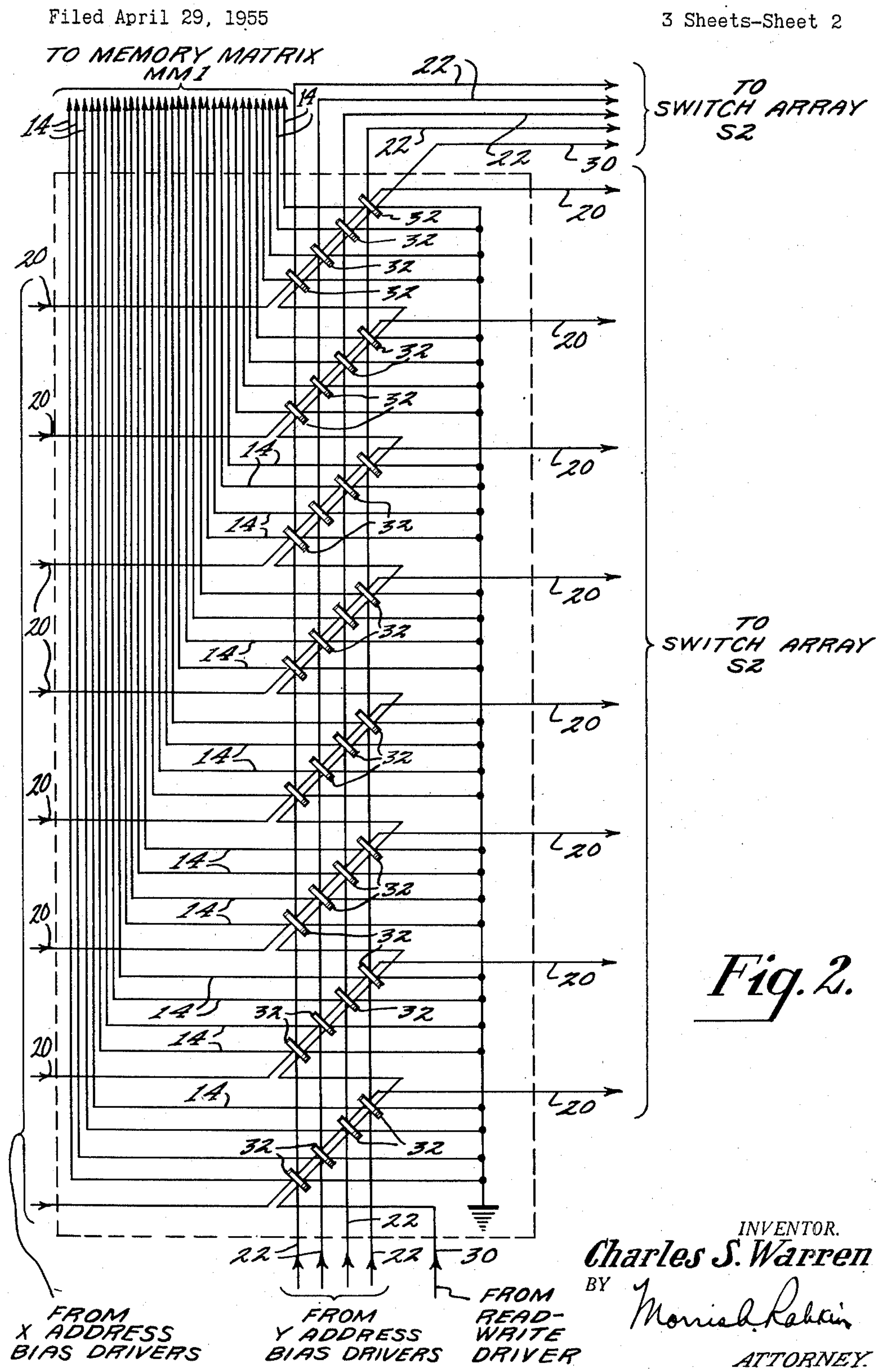
Figure 4:
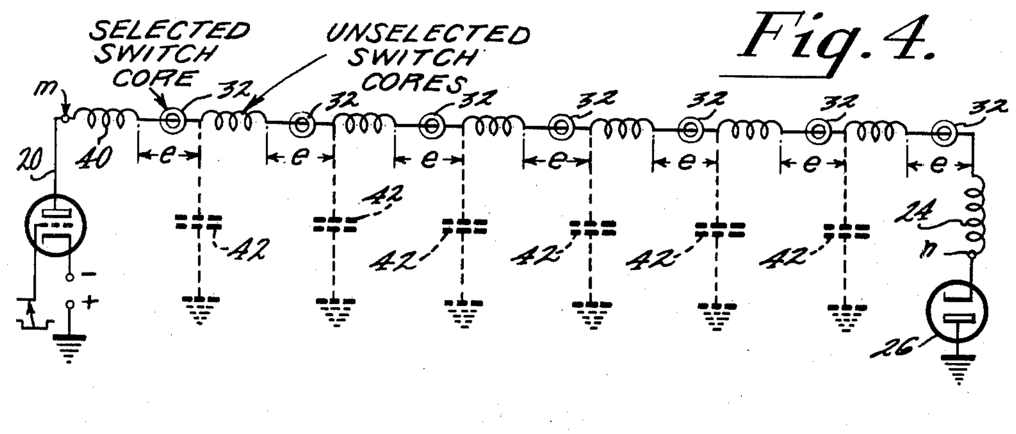
Figure 5:
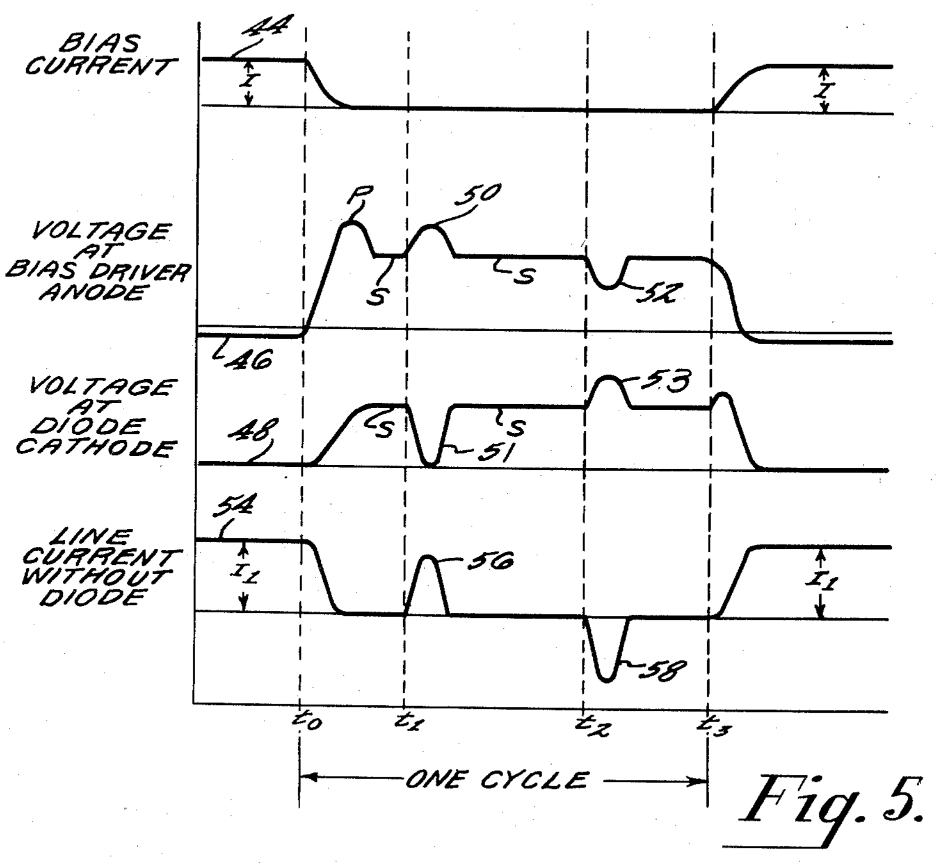

The invention will be more fully understood, both as to its organization and method of operation, from the following description when read in connection with the accompanying drawing, wherein similar reference numbers are used to designate like parts, and in which:

Fig. 1 is a schematic diagram of magnetic switch arrays arranged for driving a magnetic matrix memory, Fig. 2 is a schematic diagram of the arrangement of the cores and windings in any one switch array of Fig. 1, Fig. 3 is a hysteresis loop, somewhat idealized, of the magnetic material which may be employed in fabricating magnetic switch cores, Fig. 4 is an equivalent circuit, though not entirely accurate, of a column of cores in each of the switch arrays of Fig. 1, useful in explaining the operation of the invention, and Fig. 5 is a graph of currents and voltages produced in a selected coil of the switch array of Fig. 1.

Referring to Fig. 1, a switch array 10 includes seven different 8×4 switch arrays 12 of magnetic cores, designated S1 to S7, respectively. Each switch array 12 has a set of thirty-two different output leads 14. Each set of output leads may be connected, for example, to one two-dimensional array of magnetic cores of a three-dimensional magnetic memory. An example of a memory system employing magnetic cores is described in Patent No. 2,691,155 issued to M. Rosenberg et al., October 5, 1954, entitled "Memory System." A memory system having three different memory matrices is described in connection with Fig. 8 of the above-mentioned patent. Each of the memory matrices has a separate switch array associated therewith. The switch array 10 of Fig. 1 herein may be used for addressing seven memory matrices of the type illustrated in the patent. Each output lead of a set of output leads 14 of the switch array 10 can be linked to all the memory cores in one of the rows of a different one of the seven memory matrices. The one activated output lead 14 of a set is used in selecting a desired one of the memory cores in one of the rows of a memory matrix.

One output lead of each set of output leads 14 of Fig. 1 is chosen by operating a selected one of the X address bias drivers 16 and a selected one of the Y address bias drivers 18. Each of the eight driver tubes (not shown) of the X address bias drivers is linked to a corresponding row of switch cores in each of the switch arrays 12 by means of a row coil 20. Each of the driver tubes (not shown) of the Y address bias drivers 18 is linked to a corresponding column of switch cores in each of the switch arrays 12 by means of a column coil 22. After linking the cores of the last array 12, designated S7, each coil 20 or 22 is connected individually through a different, relatively large inductance 24 to a different unilateral conduction device, such as the diode rectifier 26. Thus, one terminal of each inductance 24 is connected to the cathode of a different diode 26. The anodes of the diodes 26 are connected to a common ground, indicated by the conventional ground symbol.

A read-write driver 28 has connected thereto a read-write coil 30 which is linked to every switch core of the array 10. After linking all the cores in the array 10, the read-write coil 30 is connected to ground. The read-write driver 28 is arranged to furnish a positive polarity read pulse followed, after a predetermined time, by a negative polarity write pulse to the read-write coil 30. A plurality of write current sources (not shown), a different one connected to each array S1 through S7, may be used for writing individual binary digits into the memory planes of a magnetic memory, instead of a common read-write driver 28, retaining, however, a common read driver.

A more detailed diagram of one of the switch arrays 12 is shown in Fig. 2. A different group of four switch cores 32 in a row is linked by one of the row coils 20; and a different group of eight switch cores 32 in a column is linked by one of the column coils 22.

For convenience of drawing, each of the cores 32 is shown as a rectangle; and each coil linkage is illustrated as a single turn, intersecting the rectangle. In practice, each coil may have many turns linking the various cores. It is desirable to have many row and column turns linking the switch cores and, preferably, a single output turn linking a switch core. The large ratio between the coil linkages and the output linkage has the effect of reducing the drive current requirement and increasing the drive voltage requirement. Thus, a good impedance match is produced between the vacuum tube driving source and the load which may be a magnetic memory or another switch array. An increased number of coil turns has the effect of increasing the circulating current generated by the selected switch cores when driven. Multiple turns can be used without increasing objectionable circulating current appreciably by providing a diode and an inductive element in the individual row and column coils.

Each of the set of thirty-two output leads 14 links an individual one of the cores 32. Each output lead 14 has one terminal connected to a common ground. All the cores 32 are linked by the read-write coil 30.

One manner of operating the switch array 10 is to provide a bias current in each of the address coils 20 and 22. Each of the cores 32 is then biased well into saturation in one direction, for example, that arbitrarily designated the N direction as illustrated on the characteristic of Fig. 3. By so biasing the switch cores, undesired noise voltages resulting from a partial change of flux in unselected switch cores is reduced. The point 34 of the hysteresis loop 33 of Fig. 3 represents the normal saturated condition of each of the switch cores 32 produced by the bias current. The hysteresis loop 33 is somewhat idealized but is sufficiently accurate for the present purposes.

In selecting a desired switch core 32, the bias current is removed from the one row coil 20 and the one column coil 22 which intersect in the desired core 32. The magnetization of each selected switch core 32 is then at remanence as represented in Fig. 3 by the point 36 of the loop 33. The read-write pulses of positive and negative polarities, respectively, are then applied to the read-write coil 30 by the read-write driver 28. When the positive read pulse is applied to the read-write coil 30, the magnetization of each selected switch core changes from the one direction N, represented by the point 36, along the right branch of the loop 33 to the other direction P, represented by the point 38. The magnetization of each non-selected switch core 32 is substantially unchanged by this positive pulse because of the bias currents still flowing in the remaining row and column coils. The following negative pulse applied to the read-write coil 30 changes the magnetization of the selected switch core 32 from the direction P, represented by the point 38, along the left branch of the loop 33 back to the direction N, represented by the point 34.

Each time a switch core is driven from the one to the other direction of saturation, and vice versa, a relatively large flux change is produced. Therefore, a relatively large output voltage is induced in each output lead 14 coupled to a selected switch core 32. A corresponding switch core 32 and a corresponding output lead 14 is selected in each of the switch arrays 12. By again applying bias currents to the one row coil 20 and the one column coil 22, the driven cores are once more biased to saturation in the N direction.

Consider now, the voltage and current waveforms of the address row coil 20 which links the selected switch cores 32. A somewhat simplified equivalent circuit for the selected row coil 20 is shown in Fig. 4. The one selected switch core 32 in each of the arrays 12 is illustrated in Fig. 4 by a toroid; and the other non-selected switch cores 32 which are linked in each array by this row coil 20 are illustrated in Fig. 4 as a single lumped inductance 40 for each of the arrays 12. The capacities 42 in Fig. 4 represent the distributed capacitances between the core windings and ground for each of the arrays 12. The capacities 42 are connected in shunt between the coil 20 and ground. No attempt has been made to define rigorously an equivalent circuit for the selected coil 20; however, the equivalent circuit of Fig. 4 appears to afford an adequate qualitative explanation of the operation of the present invention as that operation is presently understood. An inductor 24 and a diode 26 are also shown in Fig. 4, as well as the bias tube for the coil 20.

With reference to Fig. 5, one complete read-write cycle is illustrated by the waveforms of Fig. 5 all shown on the same time scale. The read-write cycle may be in the order of twenty microseconds. The bias current flowing in each of the address coils is shown by the waveform 44. At the time $t_0$ when the cycle is initiated, the bias current is removed from the selected row coil 20 by cutting off the bias tube. The bias then decays from its initial amplitude I to a zero amplitude. The current in the coil 20 remains at substantially zero amplitude for the duration of the cycle for reasons described hereinafter. The waveform 46 of Fig. 5 indicates the voltage taken at the point $m$ (the anode of the bias tube) of the equivalent circuit of Fig. 4 during the cycle. This voltage first increases rapidly to a peak amplitude P then decays to a steady amplitude S. The peak amplitube is caused by the inductive "kick" produced primarily by the relatively large inductance 24. The capacitances 42 of Fig. 4 are charged by this voltage.

The voltage waveform at the point $n$ (the junction between inductor 24 and the cathode of the diode 26 of Fig. 4) is indicated in Fig. 5 by the waveform 48. This voltage also reaches a steady value S when the bias current is removed. However, as shown in the waveform 48, the voltage rise at the point $n$ is delayed somewhat, probably until the inductive "kick" in the inductor 24 and possibly also those "kicks" from the selected cores 32 in the line 20, has subsided. At time $t_1$, after the bias current has decayed to a substantially zero amplitude, the read-write driver 28 is operated to apply a positive read pulse to all the cores of the array 10, including all the cores 32. This pulse drives the selected cores 32 to the opposite direction of magnetization. The voltage induced in the line 20 raises the voltage level at the point $m$ and lowers the voltage level at the point $n$ as shown by the pulses 50 and 51 of the waveforms 46, 48, respectively. Upon the termination of the read pulse 50, the voltages at the points $m$ and $n$ return to their previous steady values.

At a time $t_2$ the read-write driver 28 (Fig. 1) is operated to apply a negative write pulse to all the cores of the array 10. The voltage at the point $m$ decreases and the voltage and the point $n$ increases as shown by the pulses 52 and 53 of the waveforms 46, 48, respectively. When the write pulse is terminated, the points $m$ and $n$ return to the previous steady state values which were in effect at time $t_1$.

Note that circulating currents tend to be prevented from flowing in the coil 20 due to the diode 26 being biased to cut-off by the charged capacitances 42. Similarly, substantially no circulating currents flow in the selected column coil 22 of Fig. 1. The remaining cores of the array 10 remain biased well into saturation in the direction N.

At time $t_3$ (refer again to Fig. 5) the bias current is again applied to the selected row and column coils and the current of the coil 20 returns to its normal amplitude I, as shown by the waveform 44. The voltages at the points $m$ and $n$ decay to the initial low value which obtained at the beginning of the cycle.

The waveform 54 of Fig. 5 represents the current flow in the coil 20 with the inductance 24 and the diode 26 removed and with the end terminal of the coil 20 connected directly to ground. Shortly after time $t_0$, the current in the coil 20 decays to a substantially zero amplitude. However, when the read pulse is applied a relatively large undesirable circulating current flows in the coil 20 as illustrated by the positive peak 56 of the waveform 54. This additional current represents the accumulation of circulating currents produced by the driven switch cores 32. Each of the driven switch cores may be considered as a small voltage generator. Each generator produces a voltage "$e$" causing a circulating current to flow through the distributed capacitances 42 to ground. One return path for all these circulating currents is through the end core 32 (near the point $n$) linked by the coil 20. The circulating current flows through the end core 32 in a direction to oppose the read pulse. In practice, when a large number of cores are driven, the amplitude of this circulating current may be sufficient to prevent one or more of these end cores 32 from being driven to the direction P by the read pulse.

Another current pulse 58 occurs when the negative write pulse 52 is applied to the array 10. At the time $t_3$ when the bias current is again applied the current returns to its initial amplitude I.

The circulating current illustrated by the positive peak 56 of the waveform 54 is substantially prevented from flowing in the line due to the inductor 24 (Fig. 4). As described previously, the inductive "kick" supplied by the inductor 24 changes the distributed capacitances 42. The size of the inductor 24 is made sufficiently large, for the cores and windings in a line, such that the inductive "kick" charges the capacitances 42 to the amplitude "S" of the waveform 48 (Fig. 5). When the positive read pulse 50 is applied the voltage at the point $n$ (Fig. 4) is reduced from the value "S" to a value close to ground as shown in waveform 48. Thus, the diode 26 remains cut-off when the positive read pulse 50 is applied. The circulating current 58 of the waveform 54 is in a reverse direction to the diode 26 and is therefore substantially blocked by the diode. Accordingly the system of the present invention substantially prevents objectionable circulating currents from flowing in the coils linking the selected cores.

There has been described herein an improved means for reducing circulating currents in a magnetic switch array. By connecting an external inductance and a unilateral conducting device in series with the respective switch coils, objectionable circulating currents are reduced without requiring increased power from the driving sources.

What is claimed is:

1. A plurality of magnetic cores each linked by a coil, said coil having distributed capacitances associated therewith, an inductive element having one terminal connected to one terminal of said coil, a unilateral conducting device, means connecting said unilateral conducting device to another terminal of said inductive element, and means for applying a bias current selectively to said coil, said inductive element being adapted to provide a voltage for charging said distributed capacitances when said bias current is removed from said coil.

2. In a magnetic switch having a plurality of magnetic cores each linked by a coil, said coil having distributed capacitances associated therewith, an inductive element having one terminal connected to one terminal of said coil, a unilateral conducting device, means connecting said unilateral conducting device to another terminal of said inductive element, a plurality of output windings, a different one of said output windings linking a separate one of said cores, and means for applying a bias current selectively to said coil, said inductive element being effective upon removal of said bias current from said coil to charge said distributed capacitances.

3. A plurality of magnetic cores each linked by a coil, said coil having distributed capacitances associated therewith, an inductive element having one terminal connected to one terminal of said coil, a unilateral conducting device, means connecting said unilateral conducting device to another terminal of said inductive element, means for applying a bias current selectively to said coil, said inductive element effective upon removal of said bias current from said coil to charge said distributed capacitances, a read-write coil linking said cores, and means for applying positive and negative drive pulses to said read-write coil.

4. In a magnetic switch having a plurality of magnetic cores each linked by a common coil, different ones of said cores being linked by a different one of a plurality of other coils, and each of said coils normally having a bias current flowing therein during operation, apparatus for reducing circulating currents in said switch comprising a plurality of inductive elements, and a plurality of unilateral conducting devices poled to pass said coil bias current, each said coil having one of said inductive elements and one of said unilateral conducting devices therein, the relative inductances of said inductive elements being large with respect to the inductances of their respective coils.

5. In a magnetic switch having a plurality of magnetic cores arranged in rows and columns, each said column of cores being linked by a different one of a plurality of column coils, each said row of cores being linked by a different one of a plurality of row coils, and all said cores being linked by a common coil, said row and column coils normally having a bias current applied thereto during operation, apparatus for reducing circulating currents in said switch when positive and negative pulses are applied to said common coil comprising a plurality of inductive elements, a plurality of unilateral conducting devices, each said coil having one of said inductances and one of said unilateral conducting devices connected thereto, and means for removing said bias current from a selected coil, said inductive element of said selected coil effective upon the removal of said bias current to cause said unilateral conducting device of said selected coil to be biased to cut-off during the application of said pulses to said common coil.

6. In a magnetic switch having: (1) a plurality of magnetic cores arranged in rows and columns, (2) a plurality of row and column coils, certain ones of said row cores being linked by a particular one of said row coils and certain ones of said column cores being linked by a particular one of said column coils, said particular row and column coils intersecting in predetermined ones of said row cores, each of said particular coils having a distributed capacitance associated therewith and normally having a bias current flowing therein during operation, and (3) means for selecting said predetermined cores by removing said bias current from said particular row and column coils, apparatus for reducing circulating currents in said switch comprising means effective upon removal of said bias currents in said particular row and column coils to charge the distributed capacitances associated with said particular coils, and a plurality of unilateral conducting devices each connected to a separate one of said particular coils, said unilateral conducting devices being biased to cut-off in the direction of further circulating currents by said charged distributed capacitances.

7. In a magnetic switch having: (1) a plurality of magnetic cores arranged in rows and columns, (2) a plurality of row coils and column coils, each of said row coils linking a different plurality of said row cores, and each of said column coils linking a different plurality of said column cores, said row and column coils intersecting in predetermined ones of said row cores, each of said coils having a distributed capacitance associated therewith and normally having a bias current flowing therein during operation, and (3) means for selecting desired ones of said cores by removing said bias current from a selected one of said row coils, and a selected one of said column coils, apparatus for reducing circulating currents in said switch comprisng means effective upon removal of said bias currents in said selected row and column coils to charge the distributed capacitances associated with said selected coils, and a plurality of unilateral conducting devices each connected to a separate one of said coils, said unilateral conducting devices being biased to cut-off in the direction of further circulating currents by said charged distributed capacitances.

8. A plurality of magnetic cores each linked by a common coil, a plurality of other coils each linked to different ones of said cores, each of said coils having a distributed capacitance associated therewith, a plurality of inductive means and a plurality of unilateral conducting means, means connecting one said inductive means and one said unilateral conducting means to respective ones of said coils, means for applying a bias current to each of said coils, means for removing said bias current from selected ones of said coils, each said inductive means of each said selected coil being effective upon removal of said bias current to cause a current flow therein in a direction to charge said distributed capacitances associated therewith so that each said unilateral conducting means of said selected coils is biased to cut-off with respect to circulating currents.

References Cited in the file of this patent

UNITED STATES PATENTS

| | | |
|---|---|---|
| 2,061,770 | Jackel | Nov. 24, 1936 |
| 2,216,820 | Lewis | Oct. 8, 1940 |
| 2,310,076 | Harder | Feb. 2, 1943 |